United States Patent
Han et al.

(10) Patent No.: US 11,931,826 B2
(45) Date of Patent: Mar. 19, 2024

(54) CONTINUOUS WELDING METHOD AND DEVICE FOR HYBRID WELDING, WELDED FINISHED PRODUCT, TRAIN BODY

(71) Applicant: CRRC QINGDAO SIFANG CO., LTD., Qingdao (CN)

(72) Inventors: Xiaohui Han, Qingdao (CN); Zhendong Mao, Qingdao (CN); Yuexin Gao, Qingdao (CN); Kai Zheng, Qingdao (CN); Gangqing Li, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 500 days.

(21) Appl. No.: 17/047,685

(22) PCT Filed: Sep. 9, 2019

(86) PCT No.: PCT/CN2019/104848
§ 371 (c)(1),
(2) Date: Oct. 14, 2020

(87) PCT Pub. No.: WO2020/206923
PCT Pub. Date: Oct. 15, 2020

(65) Prior Publication Data
US 2021/0162542 A1    Jun. 3, 2021

(30) Foreign Application Priority Data
Apr. 8, 2019    (CN) .......................... 201910277678.7

(51) Int. Cl.
*B23K 26/348* (2014.01)
*B23K 26/04* (2014.01)
*B23K 26/70* (2014.01)

(52) U.S. Cl.
CPC .......... *B23K 26/348* (2015.10); *B23K 26/048* (2013.01); *B23K 26/702* (2015.10)

(58) Field of Classification Search
CPC ................ B23K 26/348; B23K 26/048; B23K 26/702; B23K 26/046; B23K 26/062;
(Continued)

(56) References Cited

U.S. PATENT DOCUMENTS

| | | | |
|---|---|---|---|
| 2003/0136768 A1* | 7/2003 | Sonoda ................ | B23K 26/348 219/121.64 |
| 2014/0027415 A1* | 1/2014 | Lin ........................ | B23K 9/173 219/121.64 |
| 2018/0071848 A1* | 3/2018 | Walter ............... | B23K 26/0648 |

FOREIGN PATENT DOCUMENTS

| | | |
|---|---|---|
| CN | 101474726 A | 7/2009 |
| CN | 101474727 A | 7/2009 |
| CN | 102161134 A | 8/2011 |

(Continued)

OTHER PUBLICATIONS

Machine translation of CN 102161134 A (Year: 2011).*
(Continued)

*Primary Examiner* — Hung D Nguyen
(74) *Attorney, Agent, or Firm* — Womble Bond Dickinson (US) LLP

(57) ABSTRACT

A continuous welding method and device for a hybrid welding, a welded finished product and a train body. The method comprises: performing hybrid welding on a groove of a welding piece by coupling a laser and a variable polarity arc; wherein the defocusing distance of the laser is not less than a Rayleigh length of the laser. According to the method of the present disclosure, the power density of the laser on the surface of the welding piece is effectively reduced and the height-width-ratio of the weld seam is decreased, the diameter of the welding melted pore is increased, the voids caused by the collapse of the small pore in the welding (Continued)

melted pore can be effectively reduced, thereby solving the problem that the weld porosity is difficult to escape in the prior art, and reducing the generation of the pores, effectively improving welding stability and reliability, and improving the mechanical properties of the weld seams.

4 Claims, 3 Drawing Sheets

(58) Field of Classification Search
CPC .... B23K 26/0626; B23K 26/21; B23K 26/24; B23K 26/244; B23K 26/34; B23K 26/342; B23K 26/705
See application file for complete search history.

(56) References Cited

FOREIGN PATENT DOCUMENTS

| JP | H10216972 A | 8/1998 | |
|---|---|---|---|
| JP | 2008137023 A | * 6/2008 | ......... B23K 26/1429 |

OTHER PUBLICATIONS

Machine translation of JP-2008137023-A (Year: 2008).*
https://en.wikipedia.org/wiki/Rayleigh_length (Year: 2011).*
Ming et al., "Dissimilar Metal of K418 and 42CrMo Full Penetration Laser Welding", Chinese Journal of Lasers, Aug. 2006, 5 pages, vol. 33 No. 8.
The First Office Action for Chinese Application No. 201910277678.7 dated Nov. 5, 2019, 5 pages.
The First Search Report for Chinese Application No. 2019102776787 dated Apr. 8, 2019, 7 pages.
The Second Office Action for Chinese Application No. 201910277678.7 dated Apr. 15, 2020, 6 pages.
The Supplementary Search Report for Chinese Application No. 2019102776787 dated Apr. 8, 2019, 2 pages.
Jiguang et al., "Laser Detection Technology and its Application", Dec. 2016, 6 pages.
"Laser Modern Manufacturing Technology", Oct. 2007, 9 pages.
"Laser Materials Processing of High-Strength Aluminum Alloys", Oct. 2002, 12 pages.

* cited by examiner

CONTINUOUS WELDING METHOD AND DEVICE FOR HYBRID WELDING, WELDED FINISHED PRODUCT, TRAIN BODY

CROSS-REFERENCE TO RELATED APPLICATIONS

This patent application is a U.S. National Phase Application under 35 U.S.C. § 371 of International Application No. PCT/CN2019/104848, filed Sep. 9, 2019, entitled CONTINUOUS WELDING METHOD AND DEVICE FOR HYBRID WELDING, WELDED FINISHED PRODUCT, TRAIN BODY, which claims priority to Chinese patent application No. 201910277678.7 filed on Apr. 8, 2019, entitled by "Continuous Welding Method and Device for Hybrid Welding, Welded Finished Product, Train Body", which was incorporated by reference in its entirety.

FIELD OF TECHNOLOGY

The present disclosure relates to the technical field of laser arc welding, in particular to a continuous welding method and device for a hybrid welding, a welded finished product and a train body.

BACKGROUND

Aluminum alloys have advantages as high specific strength, good corrosion resistance, good plasticity, easiness in processing and shaping, and are widely used in the manufacture of the train body in the lightweight structural design of high-speed trains. Based on the needs for the overall load-bearing body structure of the high-speed trains, a large number of hollow aluminum alloy profiles are used in the manufacture of the body and integrated by tailor-welding. Compared with the traditional arc welding method for welding the aluminum alloys, the laser-arc hybrid welding method has the advantages of strong focusing characteristics, high energy density, large welding speed, small welding deformation and good joint performance, and is widely used in the engineering application.

However, the current common laser-arc hybrid welding method has the following engineering problems when using in welding large long thin-walled aluminum alloy parts:

(1) The weld porosity is difficult to eliminate due to the incomplete cleaning of the oxidation film.

In the traditional laser-arc hybrid welding process, the laser welding in the hybrid welding usually has no defocusing or a small defocusing distance. Therefore, the laser spot on the surface of the workpiece is small in size and the laser has large energy density, and the "pore effect" generated by the laser is prominent. In the laser welding process, the main power to maintain the small pores is the counter-impact pressure of the metal vapor to the back wall. As more metal being melted, a large amount of metal vapor generated in the melted pool impacts the back wall of the melted pool, which results in that the melted pool oscillates to generate the metal splash. If there is not enough metal to fill the weld seam, the small pores will collapse and thus the "small pore type" porosity will be formed. At the same time, the laser welding has high speed, and it is easy to form bubbles during the cooling and solidification process and reside in weld seams to become hydrogen pores, as shown in FIGS. 4 and 5. The traditional laser-arc hybrid welding process causes defects such as porosity and incomplete fusion inside the weld seams.

For the aluminum alloy butted structure with a backing of the hollow profiles for the high-speed train body, the small pore does not penetrate the backing during the laser welding process, and the aluminum alloy butted structure with the backing is a typical blind welded structure. In the traditional laser welding process with small defocusing or zero defocusing, the melted pool has a larger depth-to-width ratio, a smaller volume, and has high cooling and crystallization speed due to higher welding speed, which causes that the bubbles are not inclined to float and escape. Due to the existence of the porosities, the effective bearing area of the welded joint not only can be decreased but also the local stress concentration is caused, thereby reducing the strength and toughness of the welded joint and seriously affecting the service life of the welded joint. Therefore, for the butt welding of aluminum alloy with backing, the porosity defect is still an inevitable problem in the laser welding process.

(2) The high reflection of the aluminum alloy surface leads to engineering problems such as instability in a laser-arc hybrid welding process and incomplete molding.

In the existing laser-arc hybrid welding method, laser welding produces a "small pore effect", whereas in the existing laser-arc hybrid welding, the laser spot generated by the laser welded joint is usually small (the spot diameter is 0.6 mm or less). Thus, the size of the small pores produced is also small (the diameter of the small pores is 1 mm or less). Since the aluminum alloy body structure has high requirements for the assembly precision and is affected by physical properties of the aluminum alloy and the small pore effect of the laser welding; and the high-reflection of the laser and the volatilization of the metal vapor formed by the high-energy welding process cause the laser welding stability to be deteriorated and easily generates problems such as incomplete fusion; further, small pore welding formed by small spots can also lead to the increase in the difficulty of the continuous and stable control of welding; the change in the groove gap during the continuous welding of the parts and the existence of the assembled positioning weld seams also have adverse effects on the stability and reliability of the traditional small spot, small pore-laser-arc hybrid welding.

SUMMARY

Technical Problems to be Solved

The embodiment of the present disclosure provides a continuous welding method and device for a hybrid welding, a welded finished product and a train body, which are used to solve the problem that the welding porosities are difficult to escape in the prior art, and effectively improve the welding stability and reliability.

Technical Solutions

In order to solve the technical problem above, the present disclosure provides a continuous welding method for a hybrid welding, comprising: performing hybrid welding on a groove of a welding piece by coupling a laser and a variable polarity arc; wherein the defocusing distance of the laser is not less than a Rayleigh length of the laser.

In some embodiments, the laser is incident perpendicularly or obliquely from a front surface of the welding piece to the groove, the variable polarity arc is applied to the groove from a side of the laser.

In some embodiments, the variable polarity arc is applied to the groove from a rear side of the laser, i.e. the variable polarity arc is applied behind the laser.

In some embodiments, when the laser is applied to the groove of the welding piece, a spot of the laser is located on the grooves to form a weld porosity in the weld seams at the groove, a focus of the laser is located above the spot, the defocusing distance of the laser is a distance between the focus and the spot, and the defocusing distance of the laser is greater than the Rayleigh length of the laser.

In some embodiments, the defocusing distance of the laser is H, and the Rayleigh length of the laser is ZR, then H is greater than 2ZR.

In some embodiments, the method further includes:
filling welding wires in the groove while conducting the hybrid welding on the groove by the laser and variable polarity arc to cause the welding wire to be melted in the groove to form a weld seam.

The present disclosure also provides a continuous welding device for a hybrid welding, the device comprising:
a laser welding portion for generating a laser;
an arc welding portion for generating a variable polarity arc, the arc welding portion and the laser welding portion are in paraxial hybrid to perform the hybrid welding on a groove of a welding piece by coupling the laser and the variable polarity arc; and
a control mechanism respectively connected with the laser welding portion and the arc welding portion, the control mechanism is configured to control the laser welding portion such that a defocusing distance of the laser is not less than a Rayleigh length of the laser, and is configured to drive the arc welding portion to generate the variable polarity arc.

In some embodiments, the device further includes a wire feeding mechanism mounted to the side of the laser welding portion in a paraxial hybrid manner.

The present disclosure also provides a welded finished product including a first welding piece and a second welding piece with a locked backing, the first welding piece is located on the locked backing and butted with the second welding piece, a groove is formed at the butt of the first welding piece and the second welding piece, and a weld seam is formed at the groove by the method as described above.

The present disclosure also provides a train body comprising the welded finished product as described above.

Beneficial Effects

Compared with the prior art, the present disclosure has the following advantages:
through the technical solution above of the present disclosure, the following beneficial effects are achieved:
the continuous welding method for the hybrid welding, comprises: performing hybrid welding on a groove of a welding piece by coupling the laser and the variable polarity arc; wherein the defocusing distance of the laser is not less than the Rayleigh length of the laser. According to the method of the present disclosure, the laser is coupled with the variable polarity arc and the defocusing distance of the laser is increased beyond the range of the Rayleigh length, thereby effectively reducing the power density of the laser on the surface of the welding piece and decreasing the height-width-ratio of the weld seam, increasing the diameter of the welding melted pore to enhance the stability of the hybrid welding, and the voids caused by the collapse of the small pore in the welding melted pore can be effectively reduced, thereby solving the problem that the weld porosity is difficult to escape in the prior art, and reducing the generation of the hydrogen pores, effectively improving welding stability and reliability, and improving the mechanical properties of the weld seams.

BRIEF DESCRIPTION OF THE DRAWINGS

In order to more clearly illustrate technical solutions disclosed in the embodiments of the present disclosure or the prior art, the drawings used in the descriptions of the embodiments or the prior art will be briefly described below. Obviously, the drawings in the following description are only certain embodiments of the present disclosure, and other drawings can be obtained according to these drawings without any creative work for those skilled in the art.

Figure 1:
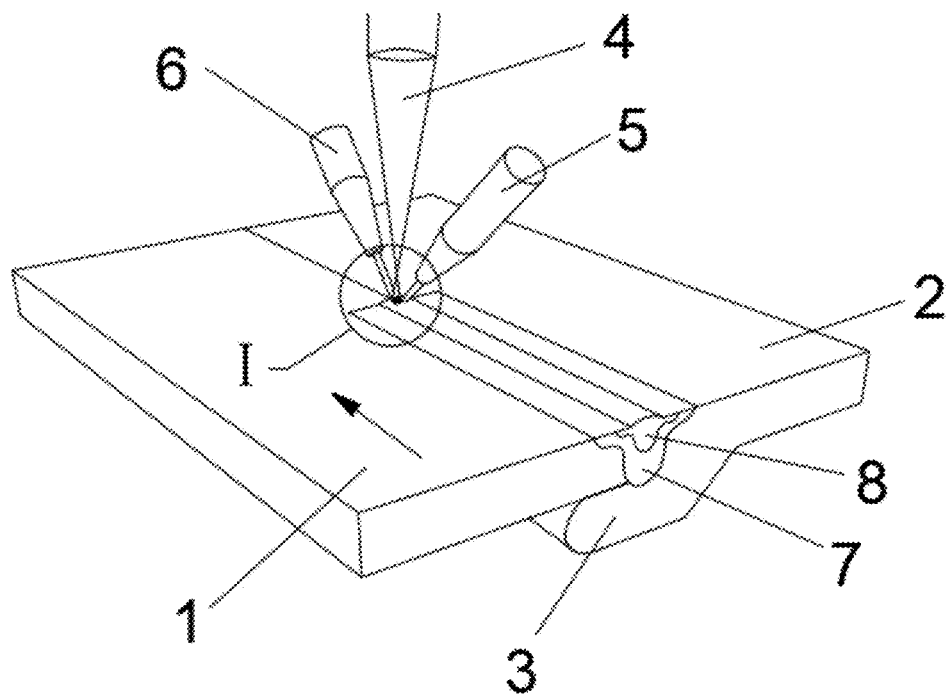
FIG. 1 is a diagram showing a welding state of a continuous welding method for a hybrid welding according to an embodiment of the present disclosure.

| Reference numbers | |
|---|---|
| 1 first welding piece | 2 second welding piece |
| 3 locked backing | 4 laser welding portion |
| 5 variable polarity arc welding portion | 6 wire feeding mechanism |
| 7 weld seam cross section | 8 welding melted pore |
| 9 spot | A focus |
| H defocusing distance | ZR Rayleigh length |

DESCRIPTION OF THE EMBODIMENTS

The specific embodiments of the present disclosure are further described in detail below with reference to the drawings and embodiments. The following embodiments are intended to illustrate the disclosure, but are not intended to limit the scope of the disclosure.

In the description of the present disclosure, "a plurality of" means two or more unless otherwise specified. The orientation or positional relationships indicated by terms such as "upper", "lower", "left", "right", "inside", "outside", "front", "rear", "head", "tail", etc. are based on the orientation or positional relationship shown in the drawings, and are merely for the convenience of describing the present disclosure and simplifying the description, rather than indicating or implying that the device or component stated must have a particular orientation and is constructed and operated in a particular orientation, and thus is not to be construed as limiting the disclosure. Moreover, the terms "first", "second" and the like are used for descriptive purposes only and are not to be construed as indicating or implying relative importance.

In the description of the present disclosure, it is to be noted that the terms "installed," "connected with," and "connected" shall be understood broadly, for example, it may be either fixedly connected or detachably connected, or can be integrated; it may be mechanically connected, or electrically connected; it may be directly connected, or indirectly connected through an intermediate medium, unless explicitly stated and defined otherwise. The specific meanings of the terms above in the present disclosure can be understood by a person skilled in the art in accordance with specific conditions.

Embodiments

Figure 2:
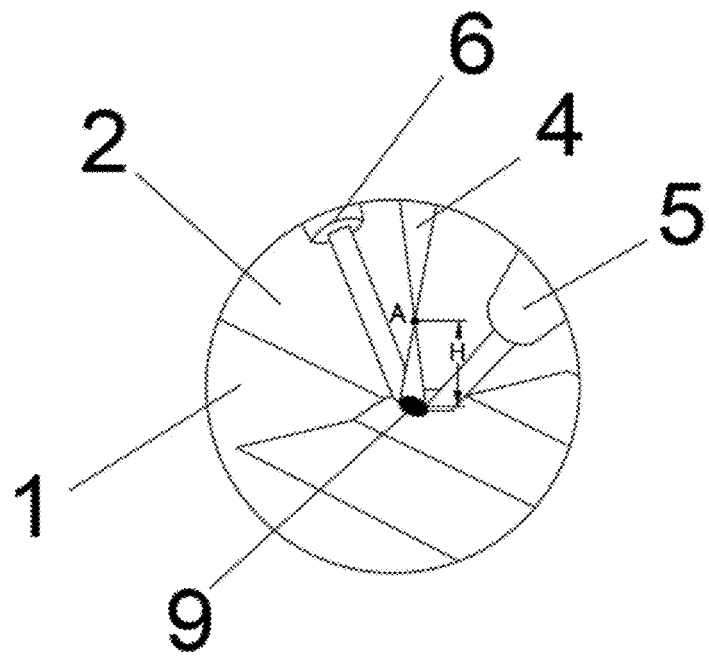
FIG. 2 is a partial enlarged view of I in FIG. 1.

As shown in FIGS. 1 and 2, the continuous welding method for the hybrid welding provided by the embodiment includes: performing hybrid welding on a groove of a welding piece by coupling the laser and the variable polarity arc. The defocusing distance H of the laser is not less than the Rayleigh length ZR of the laser. Through the method, the continuous welding on the welding piece to be welded through laser-variable polarity arc hybrid welding can be realized, the welding stability is ensured through the energy coupling action of the hybrid welding and the range of Rayleigh length of the laser is increased beyond the defocusing distance of the laser, thereby solving the problem that the weld porosity is difficult to escape in the prior art, and effectively improving welding stability and reliability.

In the traditional laser-arc hybrid welding process, the laser generated has no defocusing or a small defocusing distance H, the laser spot 9 on the surface of the workpiece is small (in a diameter of 0.6 mm) and the laser has large energy density (power density), and the "small pore effect" is prominent. In the laser welding process of hybrid welding, the main power to maintain the small pores is the counter-impact pressure of the metal vapor to the back wall. Since the laser has large energy density (power density), more metal is melted, a large amount of metal vapor generated in the melted pool impacts the back wall of the melted pool so that the melted pool oscillates to generate the metal splash. Since there is no enough metal to fill the weld seams, the small pores collapse and thus the "small pore type" porosity will be formed in the weld seam cross section 7. At the same time, the traditional laser-arc hybrid welding process has high speed, and the small pore is easy to form bubbles and reside in weld seams to become hydrogen pores during the cooling and solidification process. Therefore, the traditional laser-arc hybrid welding process easily causes defects such as the porosities formed inside the weld seams and incomplete fusion of the groove of the welding piece.

However, in the method of the embodiment of the present disclosure, the hybrid welding is performed on the groove of the welding piece through the coupling function between the laser and the variable polarity arc in a laser-variable polarity arc hybrid welding. During the welding process, the defocusing distance H of the laser is increased beyond the range of Rayleigh length ZR, thereby effectively reducing the power density of the laser on the surface of the welding piece and decreasing the height-width-ratio of the weld seam, increasing the diameter of the welding melted pore 8 to enhance the stability of the hybrid welding, and at the same time, the voids caused by the collapse of the small pore in the welding melted pore 8 can be effectively reduced, thereby solving the problem that the weld porosity is difficult to escape in the prior art, reducing the generation of the hydrogen pore, ensuring the effective escapement of the porosity and decreasing quality defects such as un-melted sidewalls such that the weld seam forming and the welding quality and mechanical properties of the welding piece are greatly improved. At the same time, when the method described in this embodiment is applied for welding, the width of the weld seam generated on the welding piece is increased by 2 to 3 times compared with the conventional laser-arc hybrid welding, the adaptability to the welding engineering of assembly gap and positioning weld is greatly enhanced when large-scale parts are assembled through the welding piece.

It should be noted that, especially for the aluminum alloy sheet, by adopting the method described in the embodiment, the porosities and molding problems generated in the laser welding process of the aluminum alloy sheet can be effectively solved, and the stability and reliability of the laser arc welding can be enhanced and the method is suitable for continuous welding of longer, thinner and thin-walled parts.

A high-speed train body usually involves a butted structure with a locked backing. The structure of the butted structure can be seen in the structure of the welded finished product described below. In order to prevent weld seam missing and undercuts on the weld surface and form good weld seam shape during welding, it is usually necessary to leave a backing at the bottom inside the groove to be welded formed when two butted welding pieces are butted.

The backing is typically designed to be integrated with the end of one welding piece, and the end of the other welding piece is lapped over the backing and the ends of two welding pieces are ensured to be butted, the groove to be welded is formed at the butt joint of two welding pieces and this butted structure is referred to as a "but-joint structure with a locked backing", and said backing is locked backing.

Similarly, for the aluminum alloy butted structure with a backing of the hollow profiles for the high-speed train body, in order to ensure the welding quality during the welding process of the butted structure, the small pore generated the laser cannot be allowed to penetrate the backing 3. Therefore, the butted structure with the backing (i.e., the welded finished product described below) is a typical blind welded structure. When the blind welded structure above is welded, a melted pool for the welding has too large height-width-ratio and too small volume and the welding speed is too high if the conventional laser welding process of small defocusing or zero defocusing is adopted, such that the melted pool has too high cooling and crystallizing speed, which is not conducive to the floating and escapement of the bubbles. Due to the existence of the porosities, the effective bearing area of the welding piece not only can be decreased but also the local stress concentration is caused, thereby reducing the strength and toughness of the welding piece and seriously affecting the service life of the welding piece or even the train body.

Therefore, for the butted structure with the backing, the porosity defect caused by the welding is still an inevitable problem in the welding process. Changing the defocusing distance H of the laser during the welding process has an important effect on the welding quality. Specifically, if the remaining parameters are fixed during welding, the change in the defocusing distance H of the laser can directly change the diameter of the laser spot 9 on the surface of the welding piece, thereby affecting the amount of heat input to the surface of the welding piece during the welding process. If the defocusing distance H is too small, it will have many adverse effects on the welding quality and the welding process, including the following two adverse effects:

on the one hand, when the defocusing distance H is small, a higher laser power density will be generated on the surface of the welding piece, and thus the surface layer of the welding piece can be heated to the boiling point in the microsecond time range, thereby generating a large amount of vaporized metal vapor, and at the same time, the high-concentration vapor moves the liquid phase metal to the edge of the melted pool, forming a depression in the center of the melted pool, which is adverse to the stability of the welding melted pore 8, and it is very easy to generate porosities and form defects in the melted pool;

on the other hand, if the above-mentioned butted structure is welded by the laser welding method having a small defocusing or zero defocusing, the surface area of the convective conductive medium in the groove is relatively small and convective conduction heat is unevenly distributed in three-dimensional space due to the existence of the assembly gap at the groove of the butted structure, thereby resulting in the weld seam forming defects such as overflow and over-melting of weld metal and incomplete fusion of weld root or the sidewall of the groove.

In order to eliminate the above-mentioned adverse effects and improve the welding stability and quality, according to the method of the present embodiment, the defocusing distance H of the laser (laser beam) in the hybrid welding is increased to a range not less than the Rayleigh radius of the laser, and the variable polarity arc is coupled with the laser to improve the energy absorption rate of the surface of the welding piece through a variable polarity arc, thereby ensuring that the hybrid welding according to the embodiment generates sufficient incident energy on the surface of the welding piece, and the melted pool of the weld seam is formed stably. According to the method of the present disclosure, based on the laser-variable polarity arc welding, the defocusing distance H of the laser is increased to reduce the power density I of the laser on the surface of the welding piece and at the same time, the structure of the welding melted pore 8 is ensured to be stable, the generation of the porosities within the melted pool is effectively decreased and the forming defects are reduced, thereby improving the mechanical properties of the welded finished product eventually formed.

Figure 3:
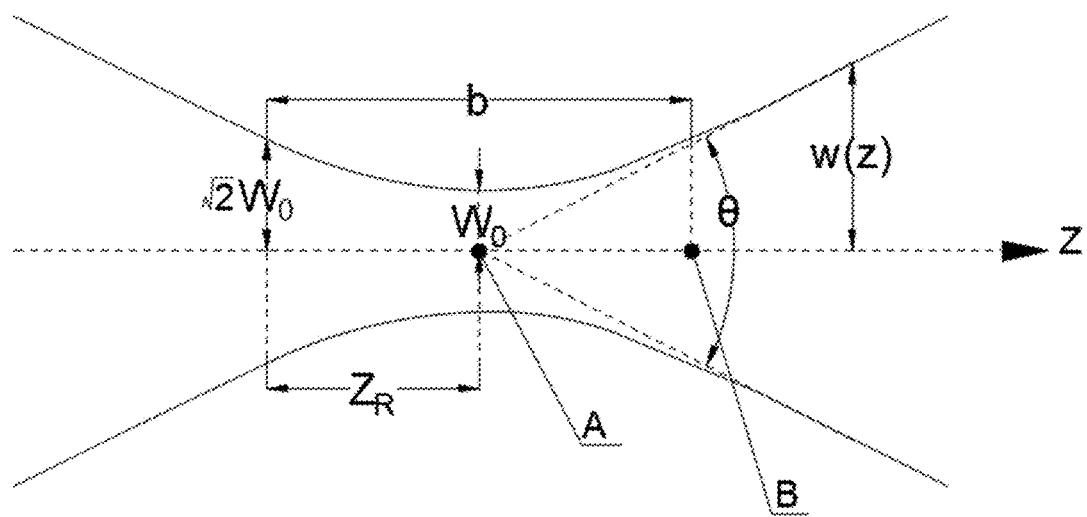
FIG. 3 is an analysis diagram of Rayleigh length of a laser according to an embodiment of the present disclosure.

Specifically, referring to FIG. 3, in the continuous welding method described in this embodiment, the laser light is incident on the groove of the welding piece in the direction of the arrow Z in FIG. 3. In optics (especially laser), the saddle waist (i.e., the position of the laser focuses A point as shown in FIG. 3) has a radius W0 and a cross-sectional area of S0. As shown by the propagation direction Z of the laser, when the cross-sectional area SZ of the laser reaches 2S0 due to scattering, it is assumed that this position is the position B as shown in FIG. 3, and the cross-sectional area of the laser at the position B is SZ=2S0. The Rayleigh length ZR or Rayleigh range described in this embodiment refers to the length from point A to point B (i.e., ZR shown in FIG. 3), and the radius of the spot 9 at the point B is W(B)=√2W$_0$, and the cross-sectional area SZ of the laser at the point B is twice the cross-sectional area S0 of the laser at the point A.

In this embodiment, the relation between the defocusing distance H and the Rayleigh length ZR of the laser is H≥Z$_R$; preferably, H>Z$_R$, further preferably, H>2*ZR, such that the power density I of the surface of the welding piece is sufficiently small, and the rate of the melted metal in the groove is further is reduced, the generation of bubbles is reduced and a sufficient response time is given for allowing the bubbles to escape. Specifically, b shown in FIG. 3 is a conjugate focal length, and b=2*ZR. W(Z) is the radius of the laser beam in the Z direction, then the minimum value of W(Z) appears at point A, i.e., W(A)=W0; θ is the abduction angle when the laser is scattered to the W(Z) position. λ is the wavelength of the laser beam, then:

$$Z_R = \frac{\pi W_0^2}{\lambda}.$$

In this embodiment, it is assumed that the power density of the laser is I, the laser energy (i.e., the laser power) is E, and the spot area of the laser is S, then:

$$I = \frac{E}{S}.$$

In the method of the embodiment of the present disclosure, when the defocusing distance H of the laser during the hybrid welding is increased to reach and exceed the range of the Rayleigh length, on the one hand, the spot area of the laser is correspondingly increased to control that the power density of the laser received on the surface of the welding piece is correspondingly decreased; it takes several milliseconds before the surface metal reaches the boiling point, the underlying metal reaches the melting point before metal on the surface layer is vaporized, which is easy to form a good melted weld in the groove; on the other hand, the width of the weld seam cross-section 7 can be effectively increased such that the height-width-ratio of the weld seam generated by the method at the groove of the welding piece is decreased, and the diameter of the welding melted pore 8 is correspondingly increased.

From this, the hybrid welding described in the present embodiment realizes laser-arc hybrid welding with a large defocusing (the defocusing distance H is beyond the range of the Rayleigh length ZR) and a large spot 9 (the spot 9 has a diameter of 2 mm or more) through the high energy density of the laser, thereby forming laser deep penetration welding having large melted pores (the pore diameter of the welding melted pore 8 is more than 3 mm) on the surface of the welding piece. At the same time of achieving high-energy and high-speed welding with high penetration depth, small deformation and low stress, a large-melting-width laser-arc hybrid welding different from the traditional laser-arc hybrid welding is obtained, and the weld seam width is two to three times that of the conventional laser-arc hybrid welding, which greatly enhances the gap adaptability and defect inhibition ability of laser-arc hybrid welding.

At the same time, in order to avoid the instability of the welding process after the defocusing distance H of the laser is increased, in the method of the embodiment, the variable polarity arc is used as the coupling heat source of the laser to achieve the stable and continuous welding to the groove of the welding piece by applying the coupling effect of the variable polarity arc and the laser to the groove of the welding piece.

During the welding process, on the one hand, the variable polarity arc makes full use of the adjustable properties of positive and negative current values and duty cycle to strengthen cathode atomization to a maximum extent to clean the oxidization film on the surface of the welding piece, thereby greatly reducing the generation of hydrogen porosities in the weld seam in the welding process; on the other hand, the introduction of the variable polarity arc serves to stabilize the welding process, enhance the gap adaptability, locate the weld seam penetration capability, and enhance the engineering adaptability. At the same time, the periodic alternating process of positive and negative polarity of the variable polarity arc plays a key role in ensuring the continuous and stable welding of the large long thin-walled aluminum alloy parts.

Specifically, the alternating process of positive and negative polarity of the variable polarity arc can effectively cool the tungsten electrode joint of the arc welding portion 5, thereby further reducing the welding heat input, improving the energy absorption rate of the surface of the welding piece, and providing a further guarantee for the stability of the laser welding having large defocusing; at the same time, the positive polarity of the arc has a cathode atomization effect, which can fully clean the oxidation film on the surface of the welding piece, and the negative polarity thereof can ensure the arc tungsten electrode to be effectively cooled, thereby forming a continuous, stable, high-quality welding capability for the welding piece.

As shown in FIG. 1, in the method of the present embodiment, the laser is incident perpendicularly or obliquely from the front surface of the welding piece to the groove, and the variable polarity arc is applied to the groove from the side of the laser to constitute a paraxial hybrid relation between the laser and the variable polarity arc. Further, a variable polarity arc is applied to the groove from the rear side of the laser, i.e. the variable polarity arc is applied behind the laser. The laser beam before the arc can make the upper surface of the weld seam to be formed uniformly and faultlessly and the area of the heat source on the surface of the welding piece is larger when the arc is behind the laser. When the heat source is removed, the weld seam is cooled more slowly, which is beneficial to the escapement of gas in the melted pool, thereby avoiding the presence of bubbles in the weld seam to affect the welding quality; in addition, the heat source of the arc is located on the back side of the laser, which is equivalent to tempering the weld seam, thereby further improving the joint strength of the weld seam.

Figure 7:
FIG. 7 is a cross-sectional view of the weld seam of an experimental example of a continuous welding method for the hybrid welding according to an embodiment of the present disclosure.

Specifically, when the laser is applied to the groove of the welding piece, the spot 9 of the laser is located on the groove to form the welding melted pore 8 inside the weld seam at the groove. As the laser welding portion 4 and the arc welding portion 5 moves synchronously, a continuous weld seam is formed in the groove. As shown in FIGS. 1 and 7, it can be obvious from the weld seam cross section 7 that the welding melted pore 8 is formed in the weld seam. In this embodiment, the defocusing distance H of the laser is the distance between the focus A and the spot 9, the focus A of the laser is located above the spot 9, that is, the defocusing distance H of the laser is greater than 0, and the defocusing distance H of the laser is greater than the Rayleigh length ZR of the laser.

The method of the present embodiment further includes filling welding wires in the groove while conducting the hybrid welding on the groove through the laser and variable polarity arc to cause the welding wire to be melted in the groove to form a weld seam. Preferably, the welding wires are filled in the groove from the front side of the laser, that is, the welding wires are firstly placed in the groove, and then the coupling of the laser and the arc is applied to the welding wires in the groove to melt and fill the welding wires into the groove to form the weld seam.

In the method of the embodiment, the laser firstly performs deep penetration welding on the welding piece; then the variable-polarity arc performs preheating and arc-stabilizing effects on the groove of the welding piece during welding, thereby improving the utilization rate of laser energy, enhancing the interaction between the laser and the arc heat sources, and greatly reducing the laser energy loss caused by the high reflectivity of the aluminum alloy material itself to the laser. At the same time, the variable polarity arc makes full use of the adjustable properties of positive and negative current values and duty cycle to strengthen cathode atomization to a maximum extent to clean the oxidization film on the surface of the welding piece, thereby greatly reducing the generation of hydrogen pores in the weld seam, further decreasing the welding heat input and decreasing the height-width-ratio of the weld seam to improve its stability. While the characteristics of low stress, small deformation, high-energy and high-efficiency welding of conventional laser-arc hybrid welding are retained, the engineering adaptability of the melted pool flow and molding process is further enhanced, the weld porosity defects are effectively eliminated due to the increase in the diameter of the spot 9 and the aperture of the welding melted pore 8, the capacity to suppress the un-melted sidewalls defects inherent in deep penetration welding is improved, the weld seam forming and joint quality are further improved, and the mechanical properties are effectively improved.

Based on the method above, the present embodiment also provides a device for continuous welding for a hybrid welding. The device is configured to weld a welding piece through the method above.

Specifically, as shown in FIGS. 1 and 2, the device includes a laser welding portion 4 for generating laser, an arc welding portion 5 for generating a variable polarity arc, and a control mechanism. The arc welding portion 5 and the laser welding portion 4 are in paraxial hybrid to perform the hybrid welding on the groove of the welding piece by coupling the laser and the variable polarity arc through the continuous welding method above. In the welding, the position of the spot emitting from the laser from the laser welding portion 4 is the current welding point, and the arc generating joint of the arc welding portion 5 is directed to the current welding point, so that the coupling of the laser and the variable polarity arc is configured to melt the welding wires at the same position (that is, the current welding point) inside the groove to fill the groove through the welding wires to form the weld seam. The control mechanism is respectively connected with the laser welding portion 4 and the arc welding portion 5. The control mechanism is configured to control the laser welding portion 4 such that a defocusing distance H of the laser is not less than a Rayleigh length ZR of the laser, and is configured to drive the arc welding portion 5 to generate the variable polarity arc.

In this embodiment, the laser beam generated by the laser welding portion 4 is one of a $CO_2$ laser, a fiber laser or a semiconductor pulse laser, and the variable polarity arc generated by the arc welding portion 5 may be a tungsten inert gas (TIG) arc or a plasma arc (PA). The direction of the arrow shown in FIG. 1 is the synchronous moving direction of the laser welding portion 4 and the arc welding portion 5, that is, the welding direction.

The laser welding portion 4 and the arc welding portion 5 described in this embodiment are in paraxial hybrid. The paraxial hybrid means that the laser beam and the arc are applied to the same position of the welding piece at a predetermined angle to perform the hybrid welding on the position. It can be understood that, in the hybrid welding, in addition that the laser welding portion 4 and the arc welding portion 5 are in the paraxial hybrid, a coaxial hybrid structure may be adopted, that is, the laser welding portion 4 and the arc welding portion 5 are nested inwards and outwards and coaxially disposed so that the laser and the arc are located in the same axis and commonly applied to the same position of the welding piece.

The device of this embodiment has a dedicated welding nozzle positioning structure. Specifically, as shown in FIG. 1, adopting the direction of the laser beam emitted from the laser welding portion 4 as a baseline, the wire feeding mechanism 6 is disposed obliquely in the front of the laser welding portion 4 to form forward welding wires while the arc welding portion 5 is disposed obliquely behind the laser welding portion 4 to form backward arc such that the variable polarity arc and the laser are coupled and commonly applied to the forward welding wires. The variable polarity arc plays a role in preheating and stabilizing the laser. It is assumed that the upper part of the welding piece shown in FIG. 1 is the front side of the welding piece, the laser is incident perpendicularly or obliquely from the front side of the welding piece, and the variable polarity arc and the laser are in the paraxial hybrid, the welding wires are fed and melted in the same position at the groove to which two heat sources are applied, thereby forming a melted pool. The spaces between the welding wires of the wire feeding mechanism 6 and the laser of the laser welding portion 4, and the laser of the laser welding portion 4 and the variable polarity arc of the arc welding portion 5 are 0.5 mm to 1 mm, and 2 mm to 3 mm, respectively and the relative angle of inclination in respect to the laser are 25 degrees to 30 degrees and 30 degrees to 40 degrees, respectively. Through the nozzle positioning structure described above, the cooling effect of the nozzles of the respective welded portions can be enhanced and the continuous welding capability of the nozzles can be improved.

When welding is carried out through the device of the present embodiment, the laser beam having a defocusing distance of not less than twice the Rayleigh length ZR is adopted for welding depending on the thickness of the welding piece and the welding requirements of the profiles itself. Specifically, the defocusing distance H of the laser beam is not less than 10 mm; further, the defocusing distance H of 10 mm to 20 mm is adopted for welding. The range of the defocusing distance H satisfies the requirements of being beyond the Rayleigh length ZR and is not less than twice the Rayleigh length ZR. Since the defocusing distance H of the laser is increased, the diameter of the spot 9 applied to the surface of the welding piece is increased to 2 mm or more, and the diameter of the welding melted pore 8 is further increased to 3 mm or more, and the width of the weld seam is not less than 9 mm and then the height-width-ratio of the weld is appropriately reduced, and the surface area of the welding melted pore 8 is greatly increased to enhance the stability of the continuous weld, the porosities in the weld seam are effectively escaped, and the weld seam forming and welding quality are significantly improved.

Based on the method and device above, the embodiment further provides a welded finished product. The welded finished product includes a first welding piece 1 and a second welding piece 2 with a locked backing 3, wherein the first welding piece 1 is located on the locked backing 3 and butted with the second welding piece 2, a groove is formed at the butt of the first welding piece 1 and the second welding piece 2, and a weld seam is formed at the groove by the method as described above. The locked backing 3 serves as a protective structure for the bottom of the groove of the welded finished product, the first welding piece 1 and the second welding piece 2 and the first welding piece 1 and the locked backing 3 are tightly welded through the above-described continuous welding method, thereby effectively improving the structural strength and mechanical properties of the welded finished product.

In the welded finished product of the embodiment, the first welding piece 1 and the second welding piece 2 have a defined thickness ranging from 2 mm to 6 mm since it is easy to greatly increase the laser power required for welding, improve the heat input, lower the stability of the melted pool and increase the porosity and welding defects when the thickness of the welding piece exceeds 6 mm. Therefore, the continuous welding method of the embodiment of the present disclosure is more suitable for welding aluminum alloy profile welding piece having a base material thickness of 2-6 mm to obtain the corresponding welded finished product.

This embodiment also provides a train body. The train body includes the welded finished product as described above.

Comparative Experiments

The process and effect of the continuous welding method for a hybrid welding described in this embodiment will be described in detail below through comparative experiments.

Figure 4:
FIG. 4 is a topography diagram of a weld seam of a comparative example according to an embodiment of the present disclosure.
Figure 5:
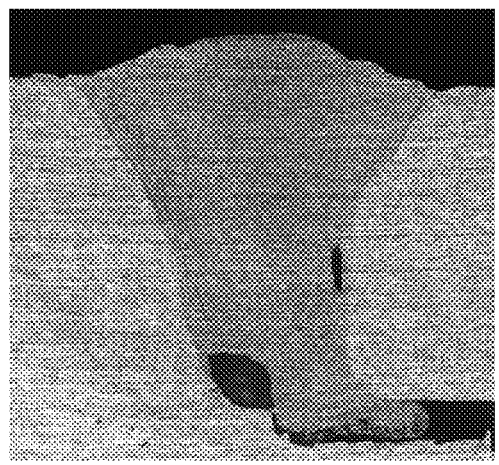
FIG. 5 is a cross-sectional view of the weld seam of a comparative example according to the embodiment of the present disclosure.

The comparative examples described in this experiment adopts the conventional laser-arc hybrid welding, and the experimental examples described in this experiment uses the continuous welding method for the hybrid welding described in this embodiment. In both the comparative example and the experimental example, two sheets each having a thickness of 4 mm and a material of 6 series aluminum alloy were used as the first welding piece 1 and the second welding piece 2 butted, and a locked backing 3 is disposed at the end of the second welding piece 2 butted with the first welding piece 1. The parameters of the conventional laser-arc hybrid welding described in the comparative examples of this experiment include that:

the laser power E1 is 4500 W, the arc current is 220 A, the welding speed is 5 m/min, the speed of the wire feeding mechanism 6 is 5 m/min, and the laser defocusing distance H of the laser welding portion 4 is zero. The front macroscopic topography of the weld seam obtained by the welding experiment in the comparative example is shown in FIG. 4 and the macroscopic morphology of the weld seam cross section of the comparative example is shown in FIG. 5.

In the method described in the experimental example of the experiment, the generation of porosities in the weld seam can be reduced, and the forming state of the weld seam can be improved by increasing the laser defocusing distance H. The welding parameters of the continuous welding method for the hybrid welding include that:

the laser power E2 is 6500 W, the arc current is 230 A, the welding speed is 4.8 m/min, the wire feeding speed is 5.5 m/min, and the laser defocusing distance H is +15 mm. The front macroscopic topography of the weld seam obtained by the welding experiment in this experimental example is shown in FIG. 6 and the macroscopic morphology of the weld seam cross section of the experimental example is shown in FIG. 7.

It is shown by comparison that:

as shown in FIGS. 4 and 5, the comparative welding piece obtained by conventional laser-arc hybrid welding has larger surplus height of the weld seam of about 1.5 mm to 2 mm; the weld seam cross section 7 has the narrower melted width of about 3 mm to 4 mm; at the same time, many visible porosities are present in the weld seam cross section, and the joints in the melted pool, welding melted pore 8 and the groove of the welding piece are formed unstably.

Figure 6:
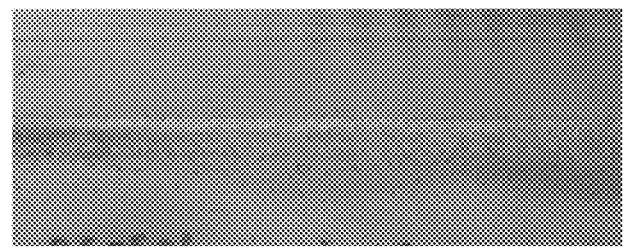
FIG. 6 is a topography diagram of a weld seam of an experimental example of a continuous welding method for the hybrid welding according to an embodiment of the present disclosure.

As shown in FIGS. 6 and 7, the experimental welding piece obtained by the continuous welding method described in this embodiment has smaller surplus height of the weld seam of about 0.5 mm to 1 mm; the weld seam cross section 7 has the wider melted width of about 8 mm to 9 mm; at the same time, porosity defects are basically eliminated from the weld seam cross section, and the joints in the melted pool, welding melted pore 8 and the groove of the welding piece are formed uniformly and stably.

From the comparison experiment, it can be shown that the welded joint structure (that is, the above-mentioned welded finished product) obtained through the method of the experimental example has a slightly larger welding deformation of the weld seam, but is much smaller than that of the conventional arc welding and it can meet the demand for continuous, stable and high-quality welding of aluminum alloy butt-joint structure with a backing (locked backing 3) for hollow profiles for high-speed train bodies.

To sum up, the continuous welding method through the hybrid welding of this embodiment includes: performing hybrid welding on the groove of the welding piece by coupling the laser and the variable polarity arc; wherein the defocusing distance H of the laser is not less than the Rayleigh length ZR of the laser. According to the method of the present disclosure, the laser is coupled with the variable polarity arc and the defocusing distance H of the laser is increased beyond the range of the Rayleigh length ZR, thereby effectively reducing the power density of the laser on the surface of the welding piece and decreasing the height-width-ratio of the weld seam, increasing the diameter of the welding melted pore 8 to enhance the stability of the hybrid welding, and at the same time, the voids caused by the collapse of the small pore in the welding melted pore can be effectively reduced, thereby solving the problem that the weld porosity is difficult to escape in the prior art, and reducing the generation of the hydrogen pore, effectively improving welding stability and reliability, and improving the mechanical properties of the weld seams.

The embodiments of the present disclosure have been presented for purposes of illustration and description, and are not intended to be exhaustive or to limit the disclosure to the form disclosed. Many modifications and variations are apparent to those skilled in the art. The embodiments are chosen and described in order to best explain the principles and embodiments of the present disclosure, and can be understood by those skilled in the art to design various embodiments with various modifications suitable for the particular application.

What is claimed is:

1. A continuous welding method for hybrid welding, wherein two welding pieces form a groove, a bottom of the groove is provided with a backing, the backing is integrated with an end of one welding piece, and an end of the other welding piece is located on the backing, the method comprising:
performing hybrid welding on the groove by coupling a laser and a variable polarity arc;
wherein a defocusing distance of the laser is H, a Rayleigh length of the laser is $Z_R$, H is greater than $2Z_R$, a conjugate focal length of the laser is b, and $b=2*Z_R$;
a radius of a laser beam of the laser in the Z direction is W(Z), and a minimum value of W(Z) appears at point A, wherein $W(A)=W_0$;
a wavelength of the laser beam is $\lambda$, wherein $$Z_R = \frac{\pi W_0^2}{\lambda};$$

a power density of the laser is I, an energy of the laser is E, and a spot area of the laser is S, wherein $$I = \frac{E}{S};$$

the method further comprising:
filling a welding wire in the groove while conducting the hybrid welding on the groove through the laser and the variable polarity arc to cause the welding wire to be melted in the groove to form a weld seam.

2. The method of claim 1, wherein the laser is incident perpendicularly or obliquely from front surfaces of the welding pieces to the groove, the variable polarity arc is applied to the groove from a side of the laser.

3. The method of claim 2, wherein the variable polarity arc is applied to the groove from a rear side of the laser.

4. The method of claim 1, wherein when the laser is applied to the groove, a spot of the laser is located on the groove to form a weld porosity in the weld seam at the groove, a focus of the laser is located above the spot, the defocusing distance of the laser is a distance between the focus and the spot.

* * * * *